United States Patent
Maierhofer

(10) Patent No.: US 9,671,222 B2
(45) Date of Patent: Jun. 6, 2017

(54) METHOD AND DEVICE FOR DETERMINING THICKNESS OF ROLLING STOCK

(75) Inventor: Andreas Maierhofer, Marloffstein (DE)

(73) Assignee: PRIMETALS TECHNOLOGIES GERMANY GMBH, Erlangen (DE)

( * ) Notice: Subject to any disclaimer, the term of this patent is extended or adjusted under 35 U.S.C. 154(b) by 607 days.

(21) Appl. No.: 14/122,178

(22) PCT Filed: May 4, 2012

(86) PCT No.: PCT/EP2012/058252
§ 371 (c)(1),
(2), (4) Date: Feb. 7, 2014

(87) PCT Pub. No.: WO2012/159870
PCT Pub. Date: Nov. 29, 2012

(65) Prior Publication Data
US 2014/0146941 A1    May 29, 2014

(30) Foreign Application Priority Data

May 25, 2011    (EP) ..................... 11167480

(51) Int. Cl.
*G01B 15/02* (2006.01)
*B21B 38/04* (2006.01)
*G01B 17/02* (2006.01)

(52) U.S. Cl.
CPC .............. *G01B 15/02* (2013.01); *B21B 38/04* (2013.01); *G01B 15/025* (2013.01); *G01B 17/02* (2013.01); *B21B 2261/08* (2013.01)

(58) Field of Classification Search
CPC ..... B21B 38/04; B21B 2261/08; G01B 15/02; G01B 17/02; G01B 15/025
(Continued)

(56) References Cited

U.S. PATENT DOCUMENTS 3,782,153 A * 1/1974 Winchester ............. B21B 37/16
72/9.4
4,088,886 A * 5/1978 Moulton ................ G01B 15/02
378/46
(Continued)

FOREIGN PATENT DOCUMENTS

CN          2928283       8/2007
CN        201692998       1/2011
(Continued)

OTHER PUBLICATIONS

"Thickness and Dimension Measurement" by Liptak et al., published in 2003.*
(Continued)

*Primary Examiner* — Paul West
*Assistant Examiner* — Xin Zhong
(74) *Attorney, Agent, or Firm* — Staas & Halsey LLP

(57) ABSTRACT

Measurement accuracy during determination of the thickness of rolling stock, in particular a rolling strip or a metal plate, is remotely measured using a base measurement value for the thickness obtained by a radiation measurement system having a radiation source and a radiation detector, both carried by a holding mechanism. A reference measurement value for the thickness is measured by an ultrasonic measurement head that is likewise arranged on the holding mechanism. The reference measurement value is used to eliminate the influence of errors on the base measurement value.

20 Claims, 1 Drawing Sheet

(58) Field of Classification Search
USPC .............. 73/620, 627, 597, 159; 72/11.8, 9.4
See application file for complete search history.

(56) References Cited

U.S. PATENT DOCUMENTS

| | | | | |
|---|---|---|---|---|
| 4,155,594 A | * | 5/1979 | Hartley | .................. E21C 35/08 |
| | | | | 250/254 |
| 4,388,830 A | * | 6/1983 | Narushima | ............ G01B 17/02 |
| | | | | 73/597 |
| 5,021,666 A | * | 6/1991 | Reber | .................... G01N 23/16 |
| | | | | 250/359.1 |
| 5,388,341 A | * | 2/1995 | Patel | ....................... B21B 38/02 |
| | | | | 33/501.02 |
| 5,546,779 A | * | 8/1996 | Ginzburg | ................ B21B 37/16 |
| | | | | 72/11.4 |
| 6,678,634 B1 | | 1/2004 | Wendt et al. | |
| 6,945,083 B2 | | 9/2005 | Sauerland et al. | |
| 7,845,637 B2 | | 12/2010 | Shimazaki | |
| 2004/0003637 A1 | | 1/2004 | Sauerland et al. | |

FOREIGN PATENT DOCUMENTS

| | | |
|---|---|---|
| CN | 201791741 | 4/2011 |
| DE | 26 00 154 | 7/1977 |
| EP | 1 369 664 A1 | 12/2003 |
| EP | 11167480.0 | 5/2011 |
| JP | 58-10604 | 1/1983 |
| JP | 60-228911 | 11/1985 |
| KR | 10-2004-0056315 | 6/2004 |
| WO | 02/088623 A2 | 11/2002 |

OTHER PUBLICATIONS

Chinese Office Action issued Oct. 10, 2014 in corresponding Chinese Patent Application No. 2012800249920.
International Search Report for PCT/EP2012/058252 mailed Jul. 16, 2012.
German OA for Application No. 11167480.0 dated Oct. 27, 2011.

* cited by examiner

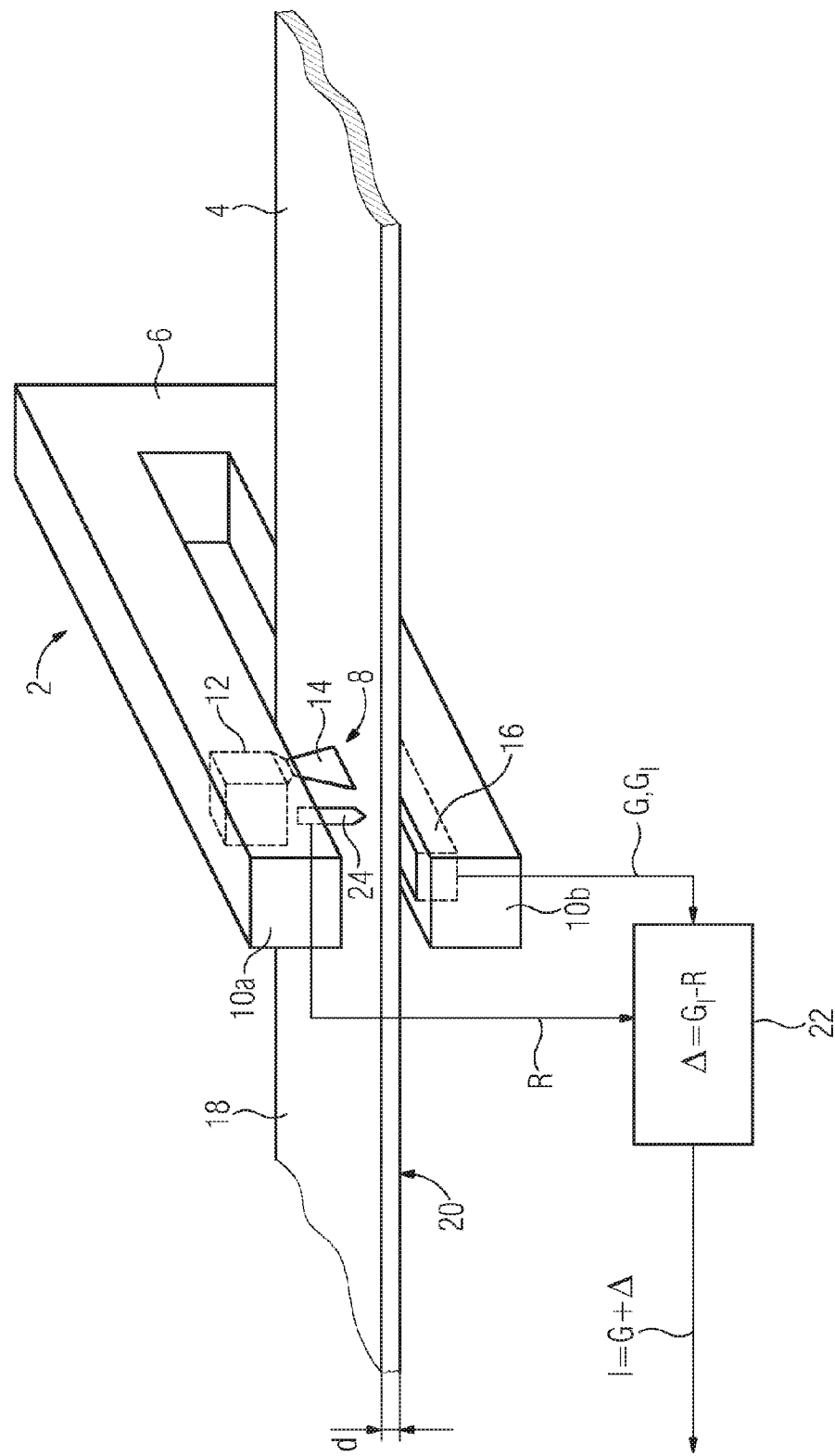

METHOD AND DEVICE FOR DETERMINING THICKNESS OF ROLLING STOCK

CROSS REFERENCE TO RELATED APPLICATIONS

This application is the U.S. national stage of International Application No. PCT/EP2012/058252, filed May 4, 2012 and claims the benefit thereof. The International Application claims the benefit of European Application No. 11167480 filed on May 25, 2011, both applications are incorporated by reference herein in their entirety.

BACKGROUND

Described below are a method for determining a thickness of rolling stock, in particular a rolling strip or a metal plate and a device for determining a thickness of such rolling stock.

In process lines, such as for example in rolling mills, thickness measurements based on the penetration of the material to be measured by radiation, for example gamma radiation or X-ray radiation, are predominantly used. The measurement of thickness using rays is based on the effect that radiation is partially absorbed when penetrating material. To this end, the beam of a radiation source is directed perpendicularly onto the material to be measured. When the density of the material to be measured is known, the thickness of the material to be measured is determined at this point with the aid of the law of absorption. In order to obtain measurement results having a very high level of accuracy, many factors and parameters do however need to be known, for example alloying constituents, temperature of the material to be measured, etc. The values are made available to the measurement device. In the case of different compositions of a material to be measured at different points in the material, if the composition is not precisely known or in the case of fluctuations in the temperature of the material to be measured the thickness measurement can therefore deliver inaccurate measurement results.

An alternative method for thickness measurement is to ascertain the thickness of the material to be measured by way of its weight. For this purpose, samples of the material to be measured must be taken which are evaluated in the laboratory. This course of action is time-consuming and results in disrupted production.

SUMMARY

The method described below provides an improvement in the accuracy of measurement when determining the thickness of rolling stock by determining a thickness of rolling stock, in particular a rolling strip or a metal plate, during rolling of the rolling stock by a rolling mill,
wherein a base measurement value for the thickness is measured with the aid of a radiation measurement system in contactless fashion, in which case the radiation measurement system is integrated in the rolling mill,
wherein a reference measurement value for the thickness is measured by an ultrasonic measurement head which is likewise integrated in the rolling mill, and
wherein the reference measurement value is used in order to eliminate the influence of errors on the base measurement value.

The device for determining a thickness of rolling stock, in particular a rolling strip or a metal plate, including:
a contactless radiation measurement system for obtaining a base measurement value for the thickness, in which case the radiation measurement system is integrated in the rolling mill,
an ultrasonic measurement head for obtaining a reference measurement value for the thickness, which is likewise integrated in the rolling mill, and
an analysis unit for eliminating the influence of errors on the base measurement value on the basis of the reference measurement value.

The advantages and embodiments detailed in the following with reference to the method can be applied by analogy to the device.

The method is based on the idea of performing a reference measurement at the location at which the radiation measurement for determining the thickness of the rolling stock is performed, the results whereof are used in order to correct the base measurement value from the radiation measurement. This means that the reference measurement takes place when the rolling stock is still situated in the rolling mill. As a result of the reference measurement, measurement inaccuracies resulting from temperature fluctuations or local differences in the composition of the rolling stock are eliminated.

An ultrasonic measurement in which it is not necessary to take a sample from the rolling stock is provided in this case as the reference measurement, which means that the ultrasonic measurement is performed in parallel with the radiation measurement and at the location of the radiation measurement. Measurements of material thicknesses by ultrasound are already known. In the case of the measurements, ultrasonic pulses are emitted from an ultrasonic measurement head onto the object to be measured and are propagated there. When the ultrasonic pulse has reached the rear wall of the object to be measured, part of the ultrasound is reflected. The determination of the thickness of the object to be measured results from the more accurate measurement of the time between the triggering of the send pulse and the receipt of the rear wall echo. The thickness of the object to be measured is calculated from the time.

What is novel regarding the method and device for determining the thickness of rolling stock is the use of ultrasonic measurement at the location where the rolling stock is processed. The principal advantage in this case is the fact that a minimal amount of time is required for the reference measurement, which means that the reference measurement by ultrasound can be integrated unproblematically into the process for processing the rolling stock. In addition, the rolling stock is not destroyed or modified by the ultrasonic measurement.

The arrangement of the radiation measurement system and of the ultrasonic measurement head can be achieved in several ways. It is important for both systems that they are positioned as close as possible to a rolling stand of the rolling mill. In this situation the radiation measurement system can be incorporated in the rolling stand. In this case the ultrasonic measurement head is advantageously likewise incorporated in the rolling stand. If there is no space available on the rolling stand for the ultrasonic measurement head, the ultrasonic measurement head can be positioned by way of a separate holder in the vicinity of the radiation measurement system and thus of the rolling stand.

According to an alternative embodiment, a radiation source and a radiation detector of the radiation measurement system are carried by a holding mechanism, in which case the ultrasonic measurement head is likewise arranged on the holding mechanism. In this case the holding mechanism is designed in particular in the manner of a so-called C measuring frame. Such a C measuring frame has two arms which in particular run parallel, and a central section which connects the two arms to one another. The radiation source is arranged on one of the arms and the radiation detector on the other. During operation, the arms of the holding mechanism in particular extend perpendicular to the direction of rolling, in other words perpendicular to the direction in which the rolling strip or the metal plate is transported.

In accordance with an embodiment, the ultrasonic measurement head for measuring the thickness of the rolling stock is moved toward the rolling stock. In contrast to measurement by the radiation measurement system which takes place in contactless fashion, contact between the ultrasonic measurement head and the rolling stock is necessary as a general rule for the ultrasonic measurement. The radiation measurement system is normally arranged in stationary fashion and the arms of the C measuring frame extend both below and also above the moving rolling stock. The radiation can thus be emitted perpendicular to the rolling stock and detected on the other side after it has penetrated the material of the rolling stock. In order that the ultrasonic measurement head, which is arranged in the vicinity of the radiation source or of the radiation detector, contacts the rolling stock, the ultrasonic measurement head is moved in the direction of the rolling stock until it touches the rolling stock. Since the holding mechanism is not spatially adjusted from its operating position relative to the rolling stock during the radiation measurement, the ultrasonic measurement head, if it is integrated in the holding mechanism of the radiation system, is moved out of the arm of the holding mechanism by way of a separate movement mechanism.

In order that neither the surface of the rolling stock nor the ultrasonic measurement head is damaged by the contact the reference value is advantageously measured on the stationary rolling stock.

It is however also conceivable to perform the measurement on the moving rolling stock, in particular if the speed of the rolling stock is reduced somewhat.

The radiation measurement by the radiation measurement system may take place at short time intervals of a few seconds or fractions of a second, in particular the contactless radiation measurement is performed continuously on the moving rolling stock. Since the radiation measurement is performed on the moving strip and the rolling stock is stopped for the ultrasonic measurement, the ultrasonic measurement advantageously takes place at greater time intervals than the radiation measurement. When a rolling strip is being rolled, this can be stopped for example after 10 meters or 20 meters in order to perform the ultrasonic measurement. When metal plates or strips are being rolled, the ultrasonic measurement takes place in particular once at the start of each plate or strip, or once per batch. The reference value is measured in particular in the head region of the strip or plate after the region has been rolled at least on one rolling stand, after which the rolling operation is continued uninterrupted.

According to an embodiment variant the reference value is obtained at a measuring point at which a base measurement value is also measured. In particular, the reference measurement value is measured at the point at which the respective last measurement has taken place using the radiation measurement system. The "same point" in this case applies at least to the width of the rolling stock, in other words in that the radiation measurement system and the ultrasonic measurement head are arranged in succession in the direction of rolling in particular and measure along a line extending in the direction of rolling. For example, the radiation measurement system and the ultrasonic measurement head may measure along the centerline of the rolling stock. This increases the accuracy of the thickness measurement because the reference measurement value relates to a point at which a base measurement value has already been measured. The radiation measurement and the ultrasonic measurement take place for example in temporal succession, in other words in that measuring takes place only using the radiation measurement system until the rolling stock has come to a stop and in particular the ultrasonic measurement is performed on the stationary rolling stock at the last measuring point at which a base measurement value was obtained. Alternatively, a base measurement value and a reference measurement value are measured simultaneously on the stationary rolling stock, in particular when measurement takes place at two different points of the rolling stock.

In accordance with an embodiment the radiation measurement system is an X-ray measurement system and the base measurement values are measured by X-ray beams. The major advantage of an X-ray radiation source is the fact that the energy of the radiation and thus the absorption constant can be optimally adjusted to the requisite thickness range. Such a contactless radiation measurement method delivers extremely precise measurement results at a very high measuring rate, which makes it particularly suitable for use in rolling mills in the aluminum and steel industries. Alternatively, measurement can also be carried out using isotope or gamma radiation.

According to a variant, in the event of deviations of the reference measurement value from the base measurement value within a predefined tolerance range an actual value for the thickness is issued which is formed from the base measurement value and the reference measurement value. The tolerance range is for example 10% of the base measurement value. If the difference between the base measurement value and the reference measurement value lies outside the tolerance range, in other words is in particular greater than 10%, this is a sign that one of the measurements has not been correctly taken. However, if the deviation of the reference measurement value from the base measurement value is minimal, in particular less than 10%, then the base measurement value is adapted to the more accurate reference measurement value. The difference between a current reference measurement value and the last base measurement value obtained before the current reference measurement value is taken into consideration with regard to the subsequent radiation measurements in that the difference is added to the new measurement values. This is done until the next calibration of the base measurement values. Alternatively, it is possible to compare the reference measurement value with the subsequent first base measurement value and to use the difference formed therefrom for adaptation of the further base measurement values.

BRIEF DESCRIPTION OF THE DRAWINGS

These and other aspects and advantages will become more apparent and more readily appreciated from the following description of an exemplary embodiment, taken in conjunction with the accompanying drawing.

In the drawing the single FIGURE shows a device for performing a reference thickness measurement on a rolling strip.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

In addition to rolling strip 4, the device 2 can be used to determine the thickness of other rolling stock, such as for example a metal plate.

The device 2 has a holding mechanism 6 for a contactless radiation measurement system 8 which in this exemplary embodiment is an X-ray measurement system. The holding mechanism 6 is designed in the manner of a C measuring frame and has two arms 10a, 10b extending parallel to one another which are spaced from the rolling strip 4 such that the strip 4 runs between them. An X-ray radiation source 12 which generates an X-ray beam or X-ray fan beam 14 is incorporated in the upper arm 10a. The X-ray beam 14 is directed perpendicular to the rolling strip 4 and penetrates the latter. In this situation the intensity of the X-ray beam 14 behind the rolling strip 4 changes. The residual intensity of the X-ray beam 4 is measured by an X-ray detector 16 which is integrated in the lower arm 10b of the C measuring frame 6.

A thickness d of the rolling strip 4 is determined by contactless X-ray beam measurement. Thickness in this case is understood to be a layer thickness between an upper side 18 and a lower side 20 of the rolling strip 4 running horizontally. The X-ray beam measurement takes place in particular continuously on the moving rolling strip 4. In this situation a multiplicity of current base measurement values G is ascertained which are delivered by the X-ray detector 16 to an analysis unit 22 which is shown symbolically in the FIGURE. In particular, a plurality of current base measurement values G per second is obtained thereby.

The thickness measurement by X-ray radiation does however have the disadvantage that the measurement results depend on many parameters, such as for example on the alloying constituents or the temperature of the rolling strip 4. Local fluctuations in the parameters can thus corrupt the measurement results. However, in order to enable as precise a thickness measurement as possible an ultrasonic measurement system is provided as a reference measurement system. The reference measurement system includes an ultrasonic measurement head 24 which is likewise integrated in the C measuring frame 6. In order to perform the ultrasonic measurement, contact between the ultrasonic measurement head 24 and the rolling strip 4 is necessary; for this reason the ultrasonic measurement system has a movement mechanism (not show here in detail) by which the ultrasonic measurement head 24 can be moved out of the arm 10a of the C measuring frame 6 in the direction of the rolling strip 4.

In order not to damage the surface of the rolling strip 4 or the ultrasonic measurement head 24 as a result of contact with the rolling strip 4, the ultrasonic measurements are performed when the rolling strip 4 is stationary. The ultrasonic measurements are thus performed at greater time intervals than the X-ray radiation measurements. For example, the ultrasonic measurements are measured once per rolling strip 4 or once per batch of rolling strips. In this situation, measuring takes place in particular in the head region of the rolling strip at the start of the rolling operation in order that the further rolling operation is continued uninterrupted.

A reference measurement value R, obtained with the aid of the ultrasonic measurement head 24, is delivered to the analysis unit 22 as in the case of the base measurement values G. The reference measurement value R is in particular taken at the same measuring point at which a last base measurement value $G_1$ before the ultrasonic measurement was ascertained. The analysis unit 22 forms a difference $\Delta$ between the last measured base measurement value $G_1$ and the reference measurement value R. If the difference $\Delta$ lies within a tolerance range of approx. 10% of the last base measurement values, each further current base measurement value G is adapted to the last reference measurement value R by the analysis unit 22 outputting an actual value I for the thickness d which is composed of the currently measured base measurement value G and the last calculated difference $\Delta$. The calculation of a new difference $\Delta$ is continued iteratively by ultrasonic measurements being performed time and time again and the results of the thickness measurement carried out by X-ray beams at different points, represented by the actual measurement values I, being adapted to the respective last reference measurement value R.

Alternatively, the reference measurement value R or the error between the base measurement and the reference measurement, which corresponds to the difference $\Delta$, can be used in order to correct a parameter, such as for example to perform an adaptation of the curve for the temperature drift or alloy content.

The comparison between the base measurement value G and the reference measurement value G can also be used in order to monitor the thickness of the rolling strip 4, the actual value or the reference value being output and in parallel thereto the difference $\Delta$ also being indicated. Example: an operator can be alerted in this situation if the difference $\Delta$ is too great and in particular lies outside the tolerance range.

Such a method for determining the thickness d of the rolling strip 4 is wherein the reference measurement is still performed locally during rolling of the rolling strip 4 and thereby delivers highly accurate measurement results particularly quickly which are used in order to eliminate the influence of errors during measurement by the radiation measurement system 8.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for determining a thickness of rolling stock during rolling of the rolling stock by a rolling mill, comprising:
    measuring, during rolling of the rolling stock, a base measurement value for the thickness by a radiation measurement system, integrated in the rolling mill, in contactless fashion,
    measuring, during rolling of the rolling stock, a reference measurement value for the thickness by an ultrasonic measurement head which is also integrated in the rolling mill, and
    using the reference measurement to eliminate influence of errors on the base measurement value.

2. The method as claimed in claim 1, wherein the rolling stock is one of a rolling strip and a metal plate.

3. The method as claimed in claim 2, wherein an ultrasonic measurement head and a radiation source and a radiation detector of the radiation measurement system are mounted on a holding mechanism.

4. The method as claimed in claim 3, wherein said measuring includes moving the ultrasonic measurement head toward the rolling stock.

5. The method as claimed in claim 4, wherein the radiation measurement by the radiation measurement system is performed repeatedly at first time intervals of less than a second to more than two seconds.

6. The method as claimed in claim 5, wherein the ultrasonic measurement is performed at second time intervals larger than the first time intervals of the radiation measurement.

7. The method as claimed in claim 6, wherein the reference measurement value is measured at a measuring point of the rolling stock at which a base measurement value is also measured.

8. The method as claimed in claim 7, wherein the base measurement value is measured by X-ray beams.

9. The method as claimed in claim 8, further comprising outputting an actual value of the thickness based on the base measurement value and the reference measurement value when deviation of the reference measurement value from the base measurement value is within a predefined tolerance range.

10. The method as claimed in claim 1, wherein the measuring of the reference measurement value for the thickness by the ultrasonic measurement head performs a contact measurement.

11. A device for determining a thickness of rolling stock during rolling of the rolling stock by a rolling mill, comprising:
    a contactless radiation measurement system, integrated in the rolling mill, obtaining a base measurement value for the thickness, during rolling of the rolling stock;
    an ultrasonic measurement head, integrated in the rolling mill, obtaining a reference measurement value for the thickness, during rolling of the rolling stock; and
    an analysis unit eliminating influence of errors on the base measurement value based on the reference measurement value.

12. The device as claimed in claim 11, wherein the rolling stock is one of a rolling strip and a metal plate.

13. The device as claimed in claim 12, further comprising a holding mechanism on which is mounted the ultrasonic measurement head and a radiation source and a radiation detector of the contactless radiation measurement system.

14. The device as claimed in claim 13, wherein the ultrasonic measurement head is movable toward the rolling stock.

15. The device as claimed in claim 14, wherein the radiation measurement system repeatedly measures the base measurement value for the thickness at first time intervals of less than a second to more than two seconds.

16. The device as claimed in claim 15, wherein the ultrasonic measurement head measures the reference measurement value for the thickness at second time intervals larger than the first time intervals.

17. The device as claimed in claim 16, wherein the ultrasonic measurement head measures the reference measurement value for the thickness at a measuring point of the radiation measurement system.

18. The device as claimed in claim 17, wherein the radiation measurement system is an X-ray measurement system.

19. The device as claimed in claim 18, wherein the analysis unit outputs an actual value of the thickness based on the base measurement value and the reference measurement value when deviation of the reference measurement value from the base measurement value is within a predefined tolerance range.

20. The device as claimed in claim 11, the ultrasonic measurement head measures the reference measurement value for the thickness by a contact measurement.

* * * * *